Dec. 3, 1957 H. D. WITZEL 2,815,064
SUSPENSION MEANS FOR FOLDING SEAT
Filed April 14, 1954 2 Sheets-Sheet 1
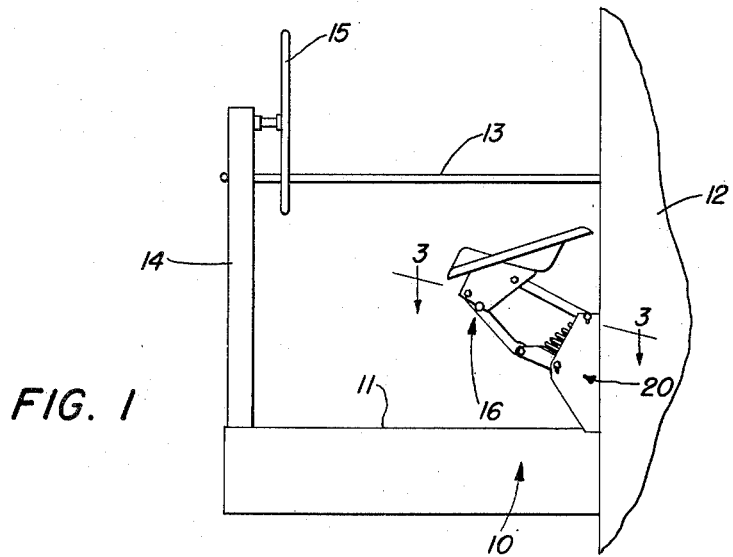
FIG. 1
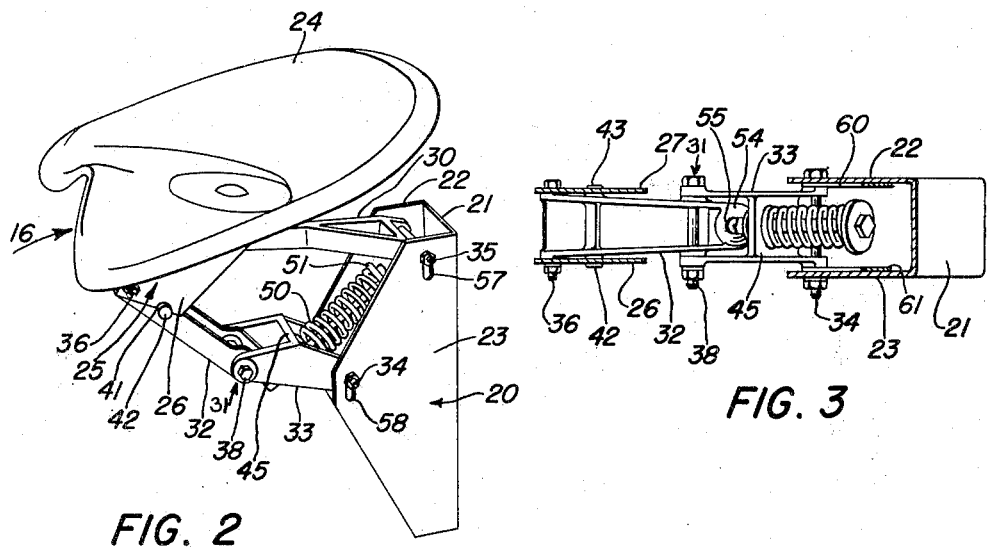
FIG. 2
FIG. 3
INVENTOR.
HOMER D. WITZEL
ATTORNEYS Dec. 3, 1957  H. D. WITZEL  2,815,064
SUSPENSION MEANS FOR FOLDING SEAT
Filed April 14, 1954  2 Sheets-Sheet 2

INVENTOR.
HOMER D. WITZEL
ATTORNEYS 2,815,064

SUSPENSION MEANS FOR FOLDING SEAT

Homer D. Witzel, Bettendorf, Iowa, assignor to Deere & Company, Moline, Ill., a corporation of Illinois Application April 14, 1954, Serial No. 423,115

13 Claims. (Cl. 155—51)

This invention relates to a seat construction and more specifically to a seat of the type designed to be easily folded upwardly and out of the way when not in use. Still more specifically the invention refers to a new and novel suspension system for connecting a folding seat to the seat support.

The prior art abounds with folding type seats and their various systems for permitting the collapsing of the seats. However, fairly uniform in the prior art is an absence of all or suitable cushion or spring means in which a degree of comfort is introduced into a folding type seat when on a moving vehicle. This is readily understandable because in most instances the primary purpose of folding seats is to preserve space by converting the area covered by the seat into a working area when the seat is not in use. Most cushioning systems are dependent upon their main support being fixed to the vehicle and normally to the floor of the vehicle, and as such are not practical for a folding or collapsible type seat.

It is therefore the purpose of this invention to introduce a cushioning system into a folding type seat that is mounted on the suspension linkage itself, that is compact enough so that it will not hinder movement of the suspension linkage when it is desired to fold or raise the seat to the up or inoperative position, and that is removed from the working area when the seat is raised.

It is also a primary purpose of this invention to provide a novel suspension linkage that is simple and inexpensive to manufacture and easily maintainable.

It is still a further object of the invention to provide means for vertically adjusting the suspension system for regulating the height of the seat.

Other objects will become readily apparent to one skilled in the art from the following detailed description of a preferred embodiment of the invention, reference being had to the accompanying drawings in which:

Fig. 1 is a side view of an operator's platform embodying the invention.

Fig. 2 is an enlarged side perspective view of the seat assembly.

Fig. 3 is a sectional view of the seat assembly taken along line 3—3 of Fig. 1.

Figure 6:
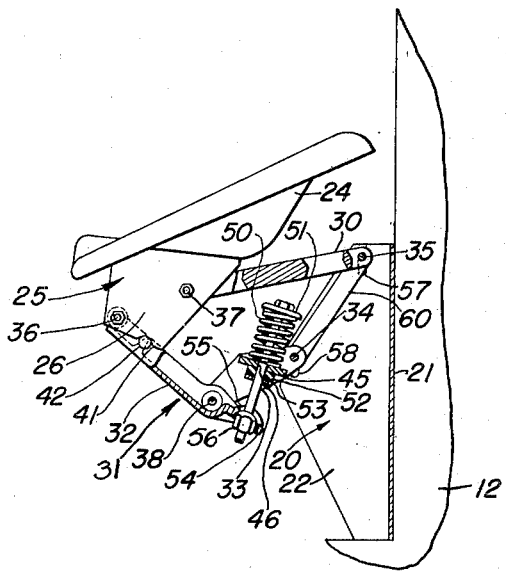
Fig. 6 is similar to Figs. 4 and 5 with the position of the seat shown when weight is applied.

Referring first to Fig. 1, an operator's station 10 is mounted on a mobile unit, the particular type of which is not important for purposes of this invention, and comprises a floor 11, an upright panel 12 at the rear of the station, a hand rail 13 extending from the panel and defining one side of the operator's station and a steering column 14 and wheel 15 mounted on the front portion of the operator's station and extending upwardly from the floor 11. Projecting from the rear panel 12 of the operator's station 10 is the seat assembly, referred to in its entirety by numeral 16.

An elongated U-shaped member or seat support 20 has a back portion 21 fixed as by welding to the panel 12 and two forwardly extending side portions 22 and 23. The seat pan 24 having front and rear ends, hereafter referred to as the seat, is disposed upwardly and forwardly of the seat support 20. Fixed to the bottom of the seat 24 is a seat bracket 25 having two laterally spaced apart, fore-and-aft extending depending wall portions 26, 27.

Suspension means extending from the seat support 20 to the seat bracket 25 and mounting the seat 24 for up and down swinging, comprises an upper rigid link 30 having one end disposed between the support side portions 22, 23 and the other end disposed between the seat bracket wall portions 26, 27, and a lower two-piece collapsible linkage or toggle 31 having a first part 32 extending rearwardly and downwardly from a position between the seat bracket wall portions 26, 27 and having a second part 33 extending from a mid-portion of the first part 32 to a position between the seat support side portions 22, 23.

The rear portions of the rigid link 30 and the second part 33 are apertured to receive transversely disposed pivot bolts 34, 35 that project laterally through slotted openings 57, 58 contained in the seat support side portions 22, 23, and the forward portions of the link 30 and the first part 32 are apertured to receive transversely disposed pivot bolts 36, 37 that project laterally through circular openings in the bracket wall portions 26, 27. The pivot bolts 34, 36 that mount the lower link means or linkage 31 to the support and bracket are positioned forwardly and downwardly from the pivot bolts 35, 37 that mount the upper link means 30. Connecting the end of the second part 33 to the mid-portion of the first part 32 is an additional transverse pivot bolt 38 that allows collapsing action of the lower linkage 31.

Mounted on each of the pivot bolts 34 through 38 is a locking nut and washer combination utilized to secure the bolts 34 through 38 against lateral movement and to prevent turning and loosening of the bolts from the inherent swinging and pivoting action of the suspension. Thus it can be seen that unless otherwise restricted the suspension is freely swingable about any of the pivot bolts 34 through 38.

Each of the seat bracket wall portions 26, 27 has a notch that is identical and laterally oppositely disposed from the other cut in its lower edge. Only one notch 41 on the wall portion 26 is visible in the drawings. Positioned to register in the notches are a pair of studs 42 and 43 extending laterally from opposite sides of the first part 32 of the collapsible linkage 31. As will later become apparent the notches and studs serve as one-way stop or weight-transfer means as respects relative downward swinging of the bracket 25 and first part 32.

The second part 33 of the collapsible linkage 31 has a laterally extending rigid portion 45 apertured at 46 to loosely receive a plunger shaft 47 which has its axis perpendicular to the plane of the rigid portion. Encircling the shaft 47 is a preloaded spring 50 or cushion member which is retained between the rigid portion 45 and a cap 51 that abuts the plunger shaft head. Mounted on the side of the rigid portion 45 opposite to that against which the spring 50 abuts is a disk type rubber cushion 52 having a metallic wearing surface 53 used for a purpose that will later be explained.

A rearward end 54 of the first part 32 of the collapsible linkage 31, when the seat 24 is in the down or operative position (see Fig. 4), is in an inverted cup or hemi-spherical form which has a fore-and-aft extending slot 55 that permits passage of the plunger shaft 47. The end of the shaft 47 that passes through the slot 55 is threaded to receive an acorn nut 56, the exterior surface of which corresponds to that of the inner surface of the socketed or cup-shaped end 54 of the first part 32. The rigid portion 45 is disposed to intercept relative upward swinging of the rearward end 54, and thus serves as stop or containing means in limiting the swinging action, while the spring 50 yieldably resists relative downward swinging of the rear end 54. Thus the lower linkage 31 for the most part is in an extended condition.

The slotted openings 57, 58 in the seat support walls 22, 23 that receive the pivot bolts 34 and 35 are elongated to permit vertical bodily adjustment of the suspension means. Adjacent to the inner surfaces of the support walls 22, 23 is a pair of rigid spacer bars 60, 61 that are apertured at their ends to receive the pivot bolts 34, 35 and serve to maintain constant spacing between the latter.

Figure 5:
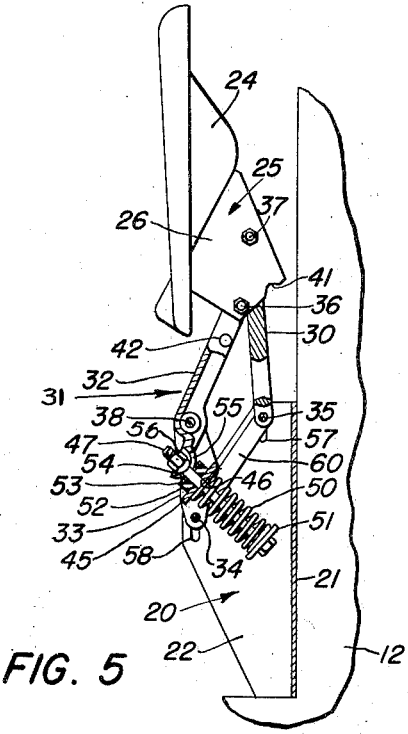
Fig. 5 is similar to Fig. 4 with the seat in the folded or up position.

The suspension operates in the following manner. When the seat 24 is in the up or folded position as shown in Fig. 5, the lower collapsible linkage 31 is held in an extended disposition by the reaction of the preloaded spring 50 against the plunger shaft 47, forcing the lower end 54 of the first part 32 of the collapsible linkage 31 to abut the metallic surface of the rubber cushion 52. The seat is stabilized or maintained in the up position by the center of gravity of the seat 24 and bracket 25 combination causing a counterclockwise moment reaction about a point located at an imaginary intersection of an extension of the first part 32 of the collapsible linkage 31 and the upper rigid link 30 forcing the seat toward the upright wall 12 until the pivot bolt 36 rests against the rigid link 30.

Figure 4:
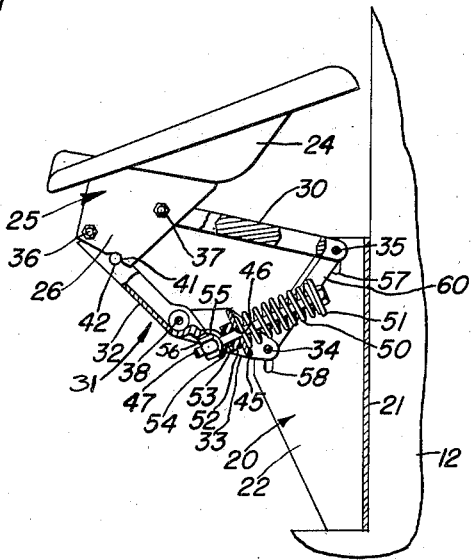
Fig. 4 is a side elevation of the seat assembly, partly in section, showing the seat in the down or operative position, with parts removed from the assembly for clarity.

The seat 24 is moved to the down or operative position by pulling out or forwardly on the lower or front end of the seat until the center of gravity is moved sufficiently forward to cause the seat to drop by its own weight. Descent will continue until the notches on the lower edge of the seat bracket 25 register with the studs 42, 43 on the first part 32 which occurs coincident with the seat reaching the operative position and at which point the first part 32 becomes unified or rigid with the bracket 25 for further downward movement as shown in Fig. 4. The spring 50 maintains the collapsible linkage in an extended condition throughout this movement and further pivotal movement of the link or part 33 about its forward end and on the pin 38 is resisted by the spring 50. In this manner the link 32 and spring 50 operate with the pins 36, 38 as connecting and cushioning means between the link 33 and seat bracket 25.

As weight is applied to the seat 24 (shown in Fig. 6), the spring 50 yields sufficiently to allow the lower linkage to partially collapse or deflect downwardly to permit downward movement of the seat 24 and first part 32 in unison with the result that the seat 24 is in suspension and in such position the spring acts as a cushion for the seat 24 against up and down motion imparted from the vehicle to the seat by resisting pivotal movement of the forward end of the link 33 about the bolt 38. The rubber disk 52 serves as a topping cushion to the part 54 with the metallic wearing surface 53 serving to prevent chafing and biting of the rubber.

In raising or folding the seat, force is applied to move the front end upwardly and rearwardly. As the seat is raised, the lower linkage 31 due to its length and the position of the pivot bolts 34, 36 in relation to the pivot bolts 35, 37 will tend to draw the front end of the seat downwardly relative to the rear end of the seat. Thus, when the seat is moved to its folded position, both the front and rear end portions thereof move upwardly and rearwardly, but the rear end portion moves to a position higher than that of the front end portion. Both the link 30 and the linkage 31 occupy generally upright positions with the linkage inclining rearwardly so that extension of the linkage would intersect the link rearwardly of the center of gravity of the seat in its folded position. As explained earlier this latter condition serves to maintain the seat in the folded position.

For purposes of this application positioning words such as "front and rear," "forwardly," "upper and lower" etc. are used primarily to provide a clear presentation of the invention and are not to be considered as words of limitation. Also, while the above description as shown is the preferred species of the invention, it is recognized that other modifications could be readily ascertained and used by one skilled in the art without departing from the basic concept of the invention. It should therefore be understood that while only one form of the invention is presented it is by no circumstances to be construed as a desire to limit the broad basic concepts set forth in the claims.

What is claimed is:

1. A folding seat of the type to be mounted forwardly of a support, fore-and-aft extending suspension means mounting the seat on the support for up and down swinging between folded and operative position, comprising a rigid link pivotally mounted to both the seat and the support and a collapsible linkage vertically spaced from the link and also pivotally mounted to both the seat and the support, stop means mounted on the seat and positioned to contact said collapsible linkage for supporting the seat or said linkage in the operative position of said seat, and cushion means connected to the collapsible linkage and maintaining extension of the linkage when the seat is in the up, down, or intermediate positions and yieldably resisting collapsing of said linkage as weight is applied on the seat.

2. A vehicle seat of the folding type comprising a support mounted on the vehicle, a seat disposed adjacent to the seat support, and suspension means extending from the support to the seat and mounting the seat for up and down swinging, said suspension means comprising a collapsible linkage having a first part hingedly connected to the seat and extending toward the support and a second part pivotally connected at one end to a mid-portion of the first part and pivotally connected at its other end to the support and having thereon a laterally extending rigid apertured portion disposed to traverse the arc of travel of the lower end of said first part and effective to limit only upward collapse of said linkage, a rigid link vertically spaced from the collapsible linkage and having opposite ends pivotally connected respectively to the seat and to the support, spring means mounted on said rigid portion, a plunger shaft passing through the rigid apertured portion and connecting the lower end of the first part to said spring means causing the latter to resist downward collapsing of the collapsible linkage, and one-way stop means on the seat and positioned to engage the first part for effecting downward movement of the seat and said first part in unison and enabling upward movement of the seat relative to said first part about the pivotal connection of the seat to said first part.

3. A vehicle seat of the folding type comprising a support mounted on the vehicle, a seat disposed adjacent to the seat support, and suspension means extending from the support to the seat and mounting the seat for up and down swinging, said suspension means comprising a collapsible linkage having a first part hingedly connected to the seat and extending toward the support and a second part pivotally connected at one end to a mid-portion of the first part and pivotally connected at its other end to the support and having thereon containing means effective to limit only upward collapse of said linkage, a rigid link vertically spaced from the collapsible linkage and having opposite ends pivotally connected respectively to the seat and to the support, cushion means interconnecting the lower end of the first part to said second part and tending to resist downward collapsing of the collapsible linkage, and one-way stop means on the seat and positioned to engage the said first part for effecting downward movement of the seat and said first part in unison and enabling upward movement of the seat relative to said first part about the pivotal connection of the seat to said first part.

4. A vehicle seat of the folding type comprising a support mounted on the vehicle, a seat disposed adjacent to the seat support, and suspension means extending from the support to the seat and mounting the seat for up and down swinging, said suspension means comprising a collapsible linkage having one end hingedly connected to the seat and its other end pivotally connected to the support and having thereon containing means effective to prevent collapsing of the linkage in one direction, a rigid link vertically spaced from the collapsible linkage and having opposite ends pivotally connected respectively to the seat and to the support, cushion means connected to the collapsible linkage and tending to resist collapsing thereof, and one-way stop means on the seat and positioned to engage the said collapsible linkage for effecting downward movement of the seat and said linkage in unison and enabling upward movement of the seat relative to said linkage about the pivotal connection of the seat to said linkage.

5. The invention defined in claim 4, further characterized by adjustable means mounted on the support for bodily adjusting said suspension means in a vertical direction.

6. A vehicle seat of the folding type comprising a support mounted on the vehicle, a seat disposed adjacent to the seat support, and suspension means extending from the support to the seat and mounting the seat for up and down swinging, said suspension means comprising a collapsible linkage having a first part hingedly connected to the seat and extending toward the support and a second part pivotally connected at one end to a mid-portion of the first part and pivotally connected at its other end to the support and having thereon a laterally extending rigid portion disposed to traverse the arc of travel of the lower end of said first part and effective to limit only upward collapse of said linkage a rigid link vertically spaced from the collapsible linkage and having opposite ends pivotally connected respectively to the seat and to the support, cushion means connecting the lower end of the first part to said rigid portion and tending to resist downward collapsing of the collapsible linkage, and oneway stop means on the seat and positioned to engage the first part for effecting downward movement of the seat and said first part in unison and enabling upward movement of the seat relative to said first part about the pivotal connection of the seat to said first part.

7. The invention defined in claim 6, further characterized by adjusting means on the seat support for regulating the vertical position of said suspension means relative to the support.

8. The invention defined in claim 7, in which the adjusting means comprises vertically elongated slots in the seat support and in which the respective ends of said second part and rigid link are pivotally connected to the support by means permitting vertical adjustment in the slots; and rigid members interconnecting the rear ends of said second part and rigid link to maintain a constant displacement therebetween.

9. A vehicle seat of the folding type, comprising a vehicle-mounted support, a seat adjacent to the support, and suspension means extending between the seat and the support and mounting the seat for up and down swinging, said suspension means including a collapsible linkage means having opposite ends hinged respectively to the seat and to the support, a rigid link spaced vertically from the linkage means and having opposite ends pivotally connected respectively to the seat and to the support, cushion means acting on the linkage means to yieldingly oppose downward collapse of said linkage means, and one-way stop means on the seat and positioned to engage the linkage means for effecting downward movement of the seat and said linkage means in unison and enabling upward movement of the seat relative to said linkage means about the hinged connection of said seat to said linkage means.

10. A vehicle seat of the folding type, comprising a vehicle-mounted support, a seat adjacent to the support, and suspension means extending between the seat and the support and mounting the seat for up and down swinging, said suspension means including a collapsible linkage means having opposite ends hinged respectively to the seat and to the support, a rigid link spaced vertically from the linkage means and having opposite ends pivotally connected respectively ot the seat and to the support, cushion means acting on the linkage means to yieldingly oppose downward collapse of said linkage means, and means on the seat positioned to engage the linkage means for effecting downward movement of the seat and said linkage means in unison.

11. Suspension means mounting a seat on an adjacent support for relative up and down movement, comprising: upper and lower link means extending between the seat and the support, pivot means connecting opposite ends of the upper link means respectively to the seat and to the support, additional pivot means connecting opposite ends of the lower link means respectively to the seat and to the support, one of said link means including a toggle deflectable when weight is applied to the seat, and yieldable means acting to yieldably resist deflection of said toggle whereby to cushion downward movement of the seat.

12. The invention defined in claim 11, in which: said toggle is effected by a pair of link parts in said one link means and pivotally interconnected to afford a hinge, and said yieldable means interconnects said pair of link parts across said joint to bias the toggle toward straightening.

13. A vehicle seat of the folding type, comprising a vehicle-mounted support, a seat ahead of the support, and suspension means mounting the seat for up and down swinging on the support, said suspension means comprising a fore-and-aft rigid upper link having front and rear ends respectively adjacent to the seat and support, front and rear upper horizontal pivots connecting said ends respectively to the seat and support, fore-and-aft lower linkage means including front and rear link parts having a horizontal hinge joint connection enabling folding and extension of said linkage, said front link part having a front end adjacent to the seat and said rear link part having a rear end adjacent to the support, a lower front horizontal pivot connecting said front end of the front link part to the seat below and ahead of the upper front pivot, a lower rear pivot connecting the rear end of the rear link part to the support below the upper rear pivot, one-way abutment means on the seat engaging the front link part from above intermediate said hinge joint connection and said lower front pivot for supporting the seat on the suspension means so that depression of the seat swings the upper link downwardly about the upper rear pivot and causes folding of the linkage as the hinge joint connection moves downwardly, said one-way abutment being upwardly disengageable from said front link part for upward tilting of the seat relative to the link and linkage about said upper and lower front pivots, and resilient means tending to extend said linkage and to resist folding thereof when the seat is depressed.

(References on following page)

References Cited in the file of this patent

UNITED STATES PATENTS

| | | |
|---|---|---|
| 163,611 | Smith | May 25, 1875 |
| 1,244,823 | Anderson | Oct. 30, 1917 |
| 1,310,671 | Rhoades | July 22, 1919 |
| 1,498,282 | Kauffmann | June 17, 1924 |
| 2,391,872 | Berg | Jan. 1, 1946 |
| 2,667,209 | Gundersen | Jan. 26, 1954 |

FOREIGN PATENTS

| | | |
|---|---|---|
| 8,311 | Great Britain | May 18, 1889 |